United States Patent [19]

Asaoka

[11] Patent Number: 5,020,615

[45] Date of Patent: Jun. 4, 1991

[54] ELECTRIC DRIVE UNIT MOUNTED TO A VEHICLE

[75] Inventor: Shinichi Asaoka, Kariya, Japan

[73] Assignee: Kabushiki Kaisha Toyoda Jidoshokki Seisakusho, Kariya, Japan

[21] Appl. No.: 475,748

[22] Filed: Feb. 6, 1990

[30] Foreign Application Priority Data

Feb. 9, 1989 [JP] Japan .................. 1-14543

[51] Int. Cl.[5] ............................................ B60K 7/00
[52] U.S. Cl. ......................................... 180/11; 180/55; 180/65.1; 180/298
[58] Field of Search ................ 180/11, 298, 55, 65.1

[56] References Cited

U.S. PATENT DOCUMENTS

| 773,575 | 11/1904 | Krotz | 180/65.1 |
|---|---|---|---|
| 3,099,326 | 7/1963 | Weigel et al. | 180/65.1 |

FOREIGN PATENT DOCUMENTS

| 52-33811 | 3/1977 | Japan . | |
| 542498 | 1/1942 | United Kingdom | 180/65.1 |
| 1414092 | 11/1975 | United Kingdom | 180/65.1 |

Primary Examiner—Mitchell J. Hill
Attorney, Agent, or Firm—Brooks Haidt Haffner & Delahunty

[57] ABSTRACT

A drive unit (D) including a front axle (18) with front axle shafts (20, 22) rotatably supported therein, an electric motor (24), and a reduction gear unit operatively connecting the electric motor to the front axle shafts. A housing (26) for the reduction gear unit fixes the electric motor (24) to the front axle (18) and a pair of brackets (28, 30) connect opposite end portions (18c) of the front axle (18) to the opposite front side frame members (10, 12), respectively, so that the housing (26) with the electric motor (24) is swingable about an axis of the front axle shafts (20, 22). Bosses (38, 40) are formed on the housing (26) and on one of the brackets (28), respectively, and a bolt (42) is inserted through the holes (38a, 40a) in the bosses for detachably fixing the housing (26) with the bracket (28), to thereby fix the electric motor (24) to the front side frame member (10) via the bracket (28).

3 Claims, 3 Drawing Sheets

ELECTRIC DRIVE UNIT MOUNTED TO A VEHICLE

BACKGROUND OF THE INVENTION

1. Field of the Invention

The present invention relates to an electric drive unit easily mountable to an industrial vehicle such as a forklift truck.

2. Description of the Related Arts

In a battery type industrial vehicle such as a forklift truck, a drive unit including a front axle and an electric motor for traction is mounted to a front part of a vehicle body. For example, Japanese Unexamined Utility Model Publication No. 52-33811 discloses a swingable mount structure in which the electric motor is fixed to the front axle and is swingable about an axis of the front axle shafts.

In such a prior art swingable mount structure, a pair of axle brackets are used for connecting opposite end portions of the front axle to opposite front side frame members of the vehicle body, respectively. Namely, one end of each of the axle brackets swingably secures one end portion of the front axle and the other end of each of the axle brackets is fixed to the front side frame member by four bolts. The electric motor is located behind the front axle and must be further fixed to a front bottom frame member of the vehicle body by an additional securing means including a support bracket, a rubber cushion and bolts, at a central position between the front side frame members.

The assembly work of the above mentioned drive unit is carried out as illustrated in FIG. 4 of the attached drawings. A vehicle body 9 of, for example, a forklift truck is supported while suspended by a hanger 92 of a conveyer rail 91 and a drive unit 8 including a front axle and an electric motor is lifted up under the vehicle body 9 by a lifter on a trolley 98. Then an operator M takes a position under the vehicle body 9 and carries out the assembly work by fitting the opposite end portions of the front axle to the axle brackets connected to the opposite front side frame members, and by fixing the support bracket of the electric motor to the front bottom frame member by bolts.

In the above described assembly work, however, the operator M must work in a bent position with the face upwardly directed while fitting the front axle and fixing the support bracket, as shown in FIG. 4. The operator M must work under great difficulty and is able to use only a restricted physical force when aligning the holes of the support bracket and the front bottom frame member, and tightening the bolts, and thus becomes fatigued in a very short time. As a result, the work efficiency is low.

Also, it is necessary to carry out a periodical inspection of brushes of the electric motor, but the available maintenance space is narrow because a battery charger is often located just behind the electric motor. Also, the entire drive unit must be detached from the vehicle for repair of the electric motor, and thus the maintenance work is difficult.

SUMMARY OF THE INVENTION

The object of the present invention is to solve the above problems and to provide a drive unit which can be easily and safely mounted to a vehicle and which can be easily maintained.

According to the present invention, there is provided a drive unit mounted to a vehicle having opposite front side frame members, the drive unit comprising a front axle with front axle shafts rotatably supported therein, an electric motor, reduction gear means operatively connecting the electric motor to the front axle shafts, a housing for housing the reduction gear means and fixedly mounting the electric motor to the front axle, a pair of axle brackets for connecting opposite end portions of the front axle to the opposite front side frame members, respectively, so that the housing with the electric motor is swingable about an axis of the front axle shafts, a first hole in the housing and a second hole in at least one of the axle brackets with the first and second holes aligned with each other, and bolt means inserted through the first and second holes for detachably fixing the housing with the axle bracket to thereby fix the electric motor to the front side frame member via the axle bracket.

With this arrangement, the assembly work can be carried out, for example, by first fitting the axle brackets to the front axle and fixing the housing to the axle bracket by the bolt means, and then lifting up the drive unit under the suspended vehicle body, as illustrated in FIG. 4, and thereafter, the operator can fix the axle brackets to the front side frame members by bolts from one or the other side of the vehicle body. The assembly work can be completed in this manner without the additional fixing of the above described support frame to the front bottom frame member just below the vehicle body.

Where maintenance of the electric motor is necessary, only the bolt means that fixes the housing to the axle bracket need be released and the other bolts fixing the axle brackets to the front side frame members remain tightened. By this operation, the electric motor is released from the axle bracket and it is possible to cause the electric motor to be swung about the axis of the front axle shafts to a lower position. In this case too, the electric motor can be easily lowered forward of the vehicle body without hindrance by the above described support frame on the bottom of the electric motor. Therefore, it is possible to easily carry out a necessary maintenance of the electric motor.

BRIEF DESCRIPTION OF THE DRAWINGS

The present invention will become more apparent from the following description of the preferred embodiment, with reference to the accompanying drawings, in which.

DESCRIPTION OF THE PREFERRED EMBODIMENT

Figure 1:
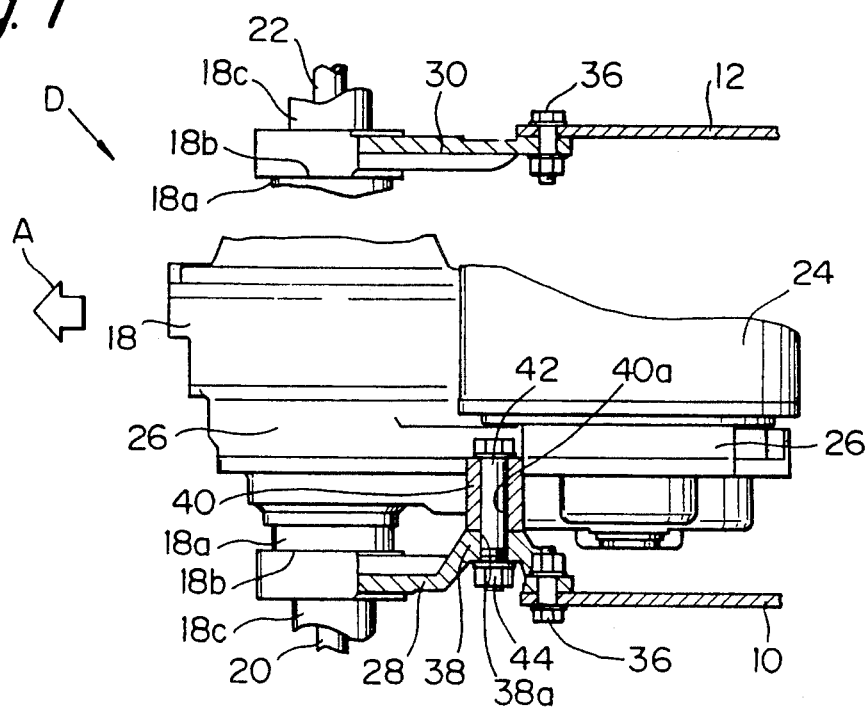
FIG. 1 is a plan view of a drive unit according to the first preferred embodiment of the present invention, with a portion illustrated in a cross-section.
Figure 2:
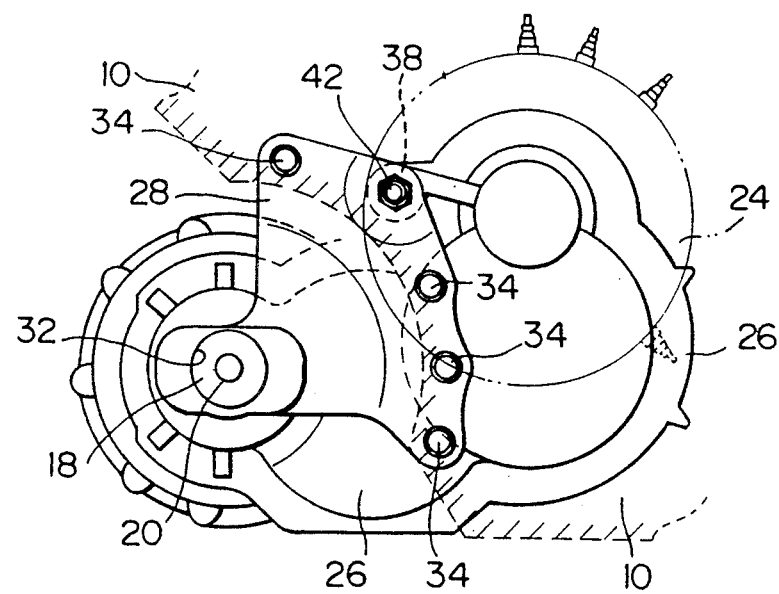
FIG. 2 is a side elevational view of the drive unit of FIG. 1.
Figure 3:
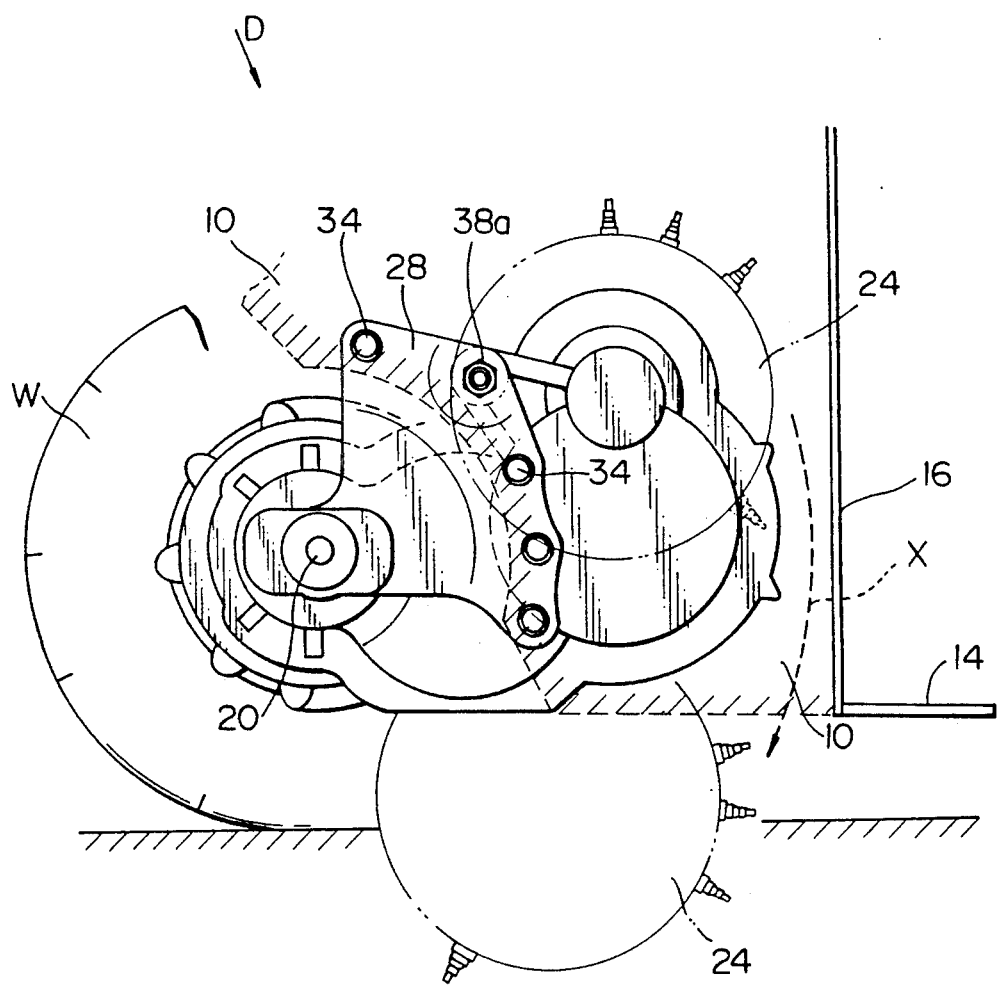
FIG. 3 is a view similar to FIG. 2 but showing the electric motor lowered.
Figure 4:
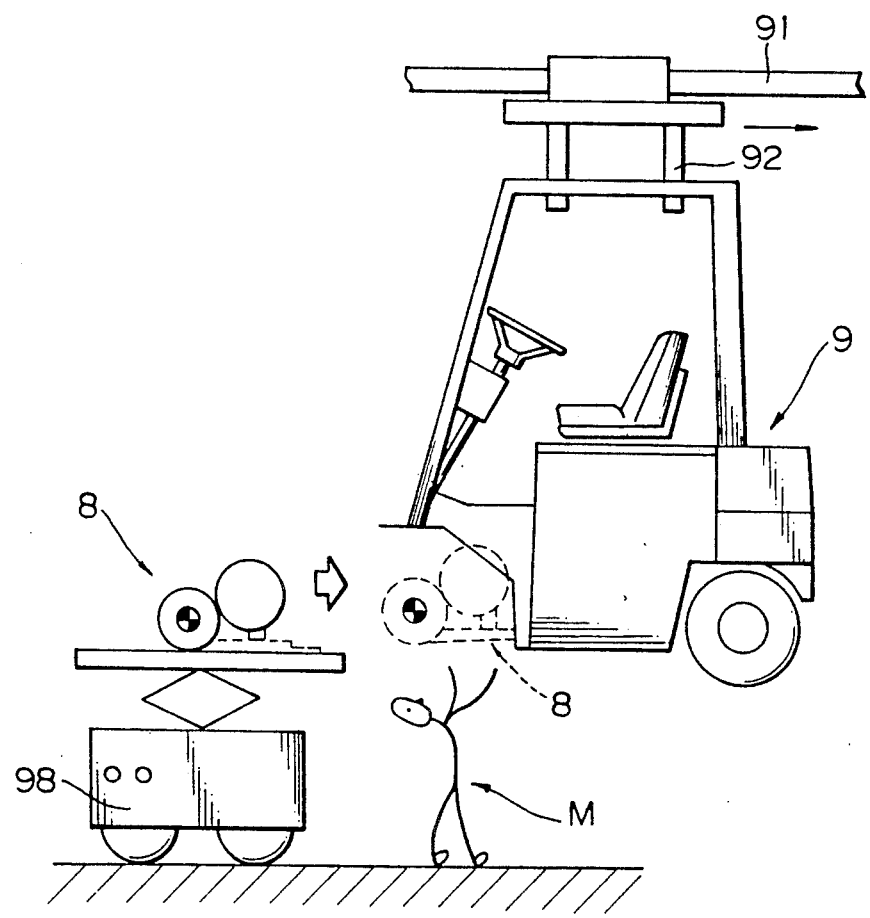
FIG. 4 is a view illustrating an assembly of a prior art drive unit to a vehicle body.

In FIGS. 1 and 2, the vehicle body of a forklift truck is only partly shown, but it is easily understood that the vehicle body has opposite front side frame members 10 and 12 from the general arrangement of FIG. 4 and from the arrow A in FIG. 1 which shows the forward driving direction of the vehicle. Also, the vehicle body includes a front bottom frame member 14 and a front transverse frame member 16, as shown in FIG. 3. A battery charger (not shown) can be installed behind the front transverse frame member 16 or the front transverse frame member 16 may be a front wall of the battery charger. The drive unit D according to the present invention is located forward of the front transverse frame member 16.

In FIGS. 1 and 2, the drive unit D includes a front axle 18 having front axle shafts 20 and 22 rotatably supported therein for connection to front wheels W (FIG. 3). It can be conceived from FIG. 1 that a differential gear can be incorporated in the front axle 18 between the front axle shafts 20 and 22. An electric motor 24 is arranged behind the front axle 18 and fixedly mounted to the front axle 18 by a housing 26. The housing 26 incorporates therein reduction gear trains to operatively connect an output shaft (not shown) of the electric motor 24 to the differential gear in the front axle 18.

The front axle 18 has opposite end portions 18a, and each end portions 18a has a shoulder 18b separating an outer small diameter axle portion 18c and an inner large diameter axle portion. A pair of axle brackets 28 and 30 are provided, each having a shape of a sector, and each of the axle brackets 28 and 30 has a relatively large hole 32 (FIG. 2) at the corner of the sector and four small filing holes 34 at the arcuate periphery of the sector. Each of the axle brackets 28 and 30 is fitted by the large hole 32 on the outer small diameter axle portion 18c of the front axle 18 in abutment with the shoulder 18b, and accordingly, the axle brackets 28 and 30 can secure the front axle 18 in position with a certain relative slidability between the axle brackets 28 and 30 and the front axle 18, so that the housing 26 with the electric motor 24 can swing about an axis of the front axle shafts 20 and 22. The four holes 34 of each of the axle brackets 28 and 30 are represented by the same reference numeral and used for fixing the axle brackets 28 and 30 to the opposite front side frame members 10 and 12, respectively, by inserting bolts 36 therethrough (FIG. 1).

The axle bracket 28 also has an inwardly facing boss 38 formed integrally therewith and having a through hole 38a extending in parallel to the axis of the front axle shafts 20 and 22. The housing 26 has a corresponding outwardly facing boss 40 formed integrally therewith and having a through hole 40a extending in parallel to the axis of the front axle shafts 20 and 22. These through holes 38a and 40a are aligned with each other, and a bolt 42 is inserted through the through holes 38a and 40a for detachably fixing the housing 26 with the axle bracket 28 and a nut 44 is tightened to the bolt 42, whereby the electric motor 24 is fixed to front side frame member 10 via the axle bracket 28.

On mounting the drive unit D to the vehicle, the axle brackets 28 and 30 are first fitted to the end portions 18c of the front axle 18, respectively, and the bolt 42 is inserted through the through holes 38a and 40a to fix the housing 26 with the axle bracket 28. Then the drive unit D is lifted up by the lifter on the trolley 98 under the suspended vehicle body, as illustrated in FIG. 4, and thereafter, the operator can fix the axle brackets 28 and 30 to the front side frame members 10 and 12 by bolts 36 from one or the other side of the vehicle body. The assembly work can be completed accordingly. Note, it is not necessary for the operator to be located just below the vehicle body for fixing the drive unit D to the vehicle body, and thus the working efficiency and safety are considerably increased.

Sometimes it may be necessary to detach the electric motor 24 for an inspection of the brushes therein, or for repair. In such a case, the nut 44 is loosened and the bolt 42 is withdrawn from the through holes 38a and 40a to release the housing 26 from the axle bracket 28, while the other bolts 36 remain tightened to fix the axle brackets 28 and 30 to the front side frame members 28 and 30. By this operation, the drive unit D is supported at the vehicle body but the electric motor 24 can be swung about the axis of the front axle shafts 20 and 22 to a lower position, as shown by the arrow X in FIG. 3. Therefore, the electric motor 24 is moved to a position remote from the front transverse frame member 16 including the battery charger, and thus it is possible to easily carry out maintenance such as an inspection of the electric motor 24. This is possible because the downward movement of the electric motor 24 is not hindered by the above described support frame on the bottom of the electric motor.

I claim:

1. A drive unit mounted to a vehicle having opposite front side frame members, said drive unit comprising a front axle with front axle shafts rotatably supported therein, an electric motor, reduction gear means operatively connecting said electric motor to said front axle shafts, a housing for housing said reduction gear means and fixedly mounting said electric motor to said front axle, a pair of axle brackets for connecting opposite end portions of said front axle to said opposite front side frame members, respectively, so that said housing with said electric motor is swingable about an axis of said front axle shafts, means defining a first hole in said housing and means defining a second hole in at least one of said axle brackets with said first and second holes aligned with each other, and bolt means inserted through said first and second holes for detachably fixing said housing with said axle bracket, to thereby fix said electric motor to said front side frame member via said axle bracket.

2. A drive unit mounted to a vehicle having opposite front side frame members, said drive unit comprising a front axle with front axle shafts rotatably supported therein, an electric motor, reduction gear means operatively connecting said electric motor to said front axle shafts, a housing for housing said reduction gear means and fixedly mounting said electric motor to said front axle, a pair of axle brackets for connecting opposite end portions of said front axle to said opposite front side frame members, respectively, so that said housing with said electric motor is swingable about an axis of said front axle shafts, means defining a first hole in said housing and means defining a second hole in at least one of said axle brackets with said first and second holes aligned with each other, and bolt means inserted through said first and second holes for detachably fixing said housing with said axle bracket, to thereby fix said electric motor to said front side frame member via said axle bracket, said at least one of said axle brackets having means defining a third hole at one end thereof for fitting said end portion of said front axle therein while allowing a swinging movement of said electric motor when said bolt means is released from said first and second holes, and a plurality of fixing holes at the other end thereof, one of said fixing holes being said second hole to be aligned with said first hole and the remaining fixing holes being used for fixing said axle bracket to said front side frame member.

3. A drive unit mounted to a vehicle having opposite front side frame members, said drive unit comprising a front axle with front axle shafts rotatably supported therein, an electric motor, reduction gear means operatively connecting said electric motor to said front axle shafts, a housing for housing said reduction gear means and fixedly mounting said electric motor to said front axle, a pair of axle brackets for connecting opposite end portions of said front axle to said opposite front side frame members, respectively, so that said housing with said electric motor is swingable about an axis of said front axle shafts, means defining a first hole in said housing and means defining a second hole in at least one of said axle brackets with said first and second holes aligned with each other, and bolt means inserted through said first and second holes for detachably fixing said housing with said axle bracket, to thereby fix said electric motor to said front side frame member via said axle bracket, each of said end portions of said front axle having a shoulder separating an outer small diameter axle portion and an inner large diameter axle portion, and each of said axle brackets being fitted on said outer small diameter axle portion in abutment with said shoulder.

* * * * *